No. 688,270. Patented Dec. 3, 1901.
M. SWENSON.
APPARATUS FOR COVERING CYLINDRICAL COTTON BALES.
(Application filed Apr. 7, 1900.)
(No Model.) 2 Sheets—Sheet 1.

Witnesses: Inventor
Magnus Swenson
by Frank L. Dyer
Att'y

No. 688,270. Patented Dec. 3, 1901.
M. SWENSON.
APPARATUS FOR COVERING CYLINDRICAL COTTON BALES.
(Application filed Apr. 7, 1900.)
(No Model.) 2 Sheets—Sheet 2.
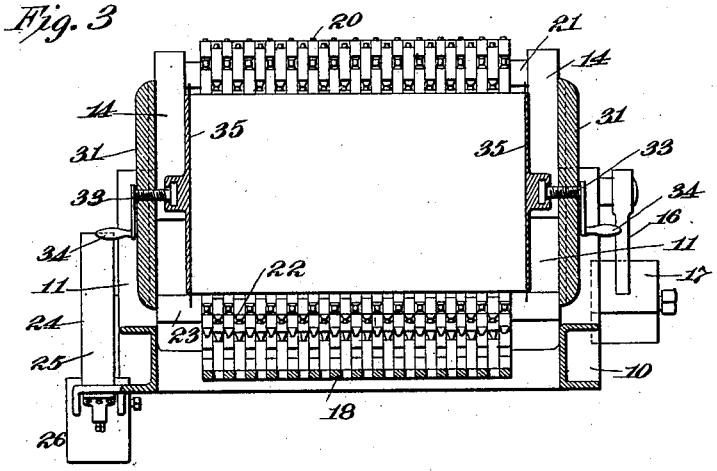
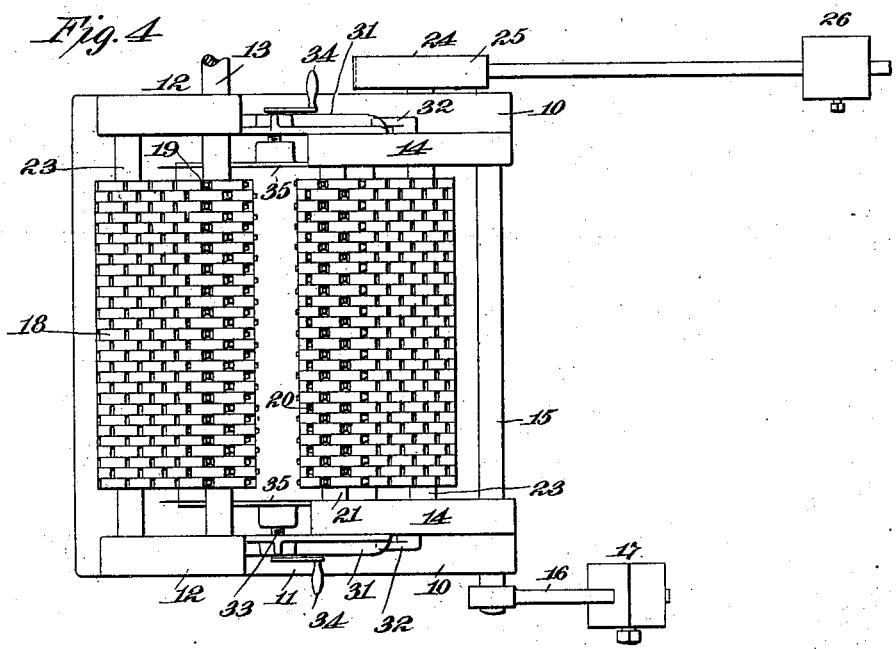
Witnesses: Inventor
Magnus Swenson
by Frank L. Dyer
Att'y

UNITED STATES PATENT OFFICE.

MAGNUS SWENSON, OF CHICAGO, ILLINOIS.

APPARATUS FOR COVERING CYLINDRICAL COTTON-BALES.

SPECIFICATION forming part of Letters Patent No. 688,270, dated December 3, 1901.

Application filed April 7, 1900. Serial No. 12,006. (No model.)

*To all whom it may concern:*

Be it known that I, MAGNUS SWENSON, a citizen of the United States, residing in the city of Chicago, county of Cook, and State of Illinois, have invented certain new and useful Improvements in Apparatus for Covering Cylindrical Cotton-Bales, of which the following is a specification.

In the manufacture of cylindrical cotton-bales in some presses, and particularly those in which belts are not employed, it is difficult to properly cover the bales, while the operation is necessarily dangerous. With all forms of presses for making such bales the time consumed in covering and removing the bales necessitates the stopping of the gins and bat-forming mechanism unless the apparatus is of some special construction as to overcome this objection—for example, by being provided with an accumulating device, into which the cotton may accumulate during the time the bale is being covered and removed, or with an additional press in which a new bale may be started while the finished bale is being covered and removed.

My present invention provides an improved apparatus by which cylindrical cotton-bales after they have been formed in a baling-press may be covered and with which the bat-forming mechanism may, if desired, be operated practically continuously, and in all instances the bat-forming mechanism may be operated more nearly continuously than would be otherwise possible with a single baling-press not equipped with accumulating devices.

My improved bale-covering machine employs an endless belt, a portion of which is formed in a loop or bight, which partially surrounds the finished bale and applies sufficient pressure thereto to result in the proper winding upon the bale of a suitable covering material.

There are details of construction in the preferred form of covering-machine which I shall describe and which may be conveniently adopted in practice.

In order that the invention may be better understood, attention is directed to the accompanying drawings, forming a part of this specification, and in which—

Figure 1:
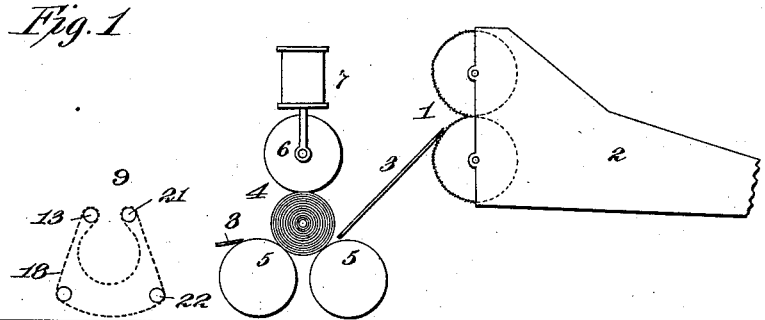
Figure 2:
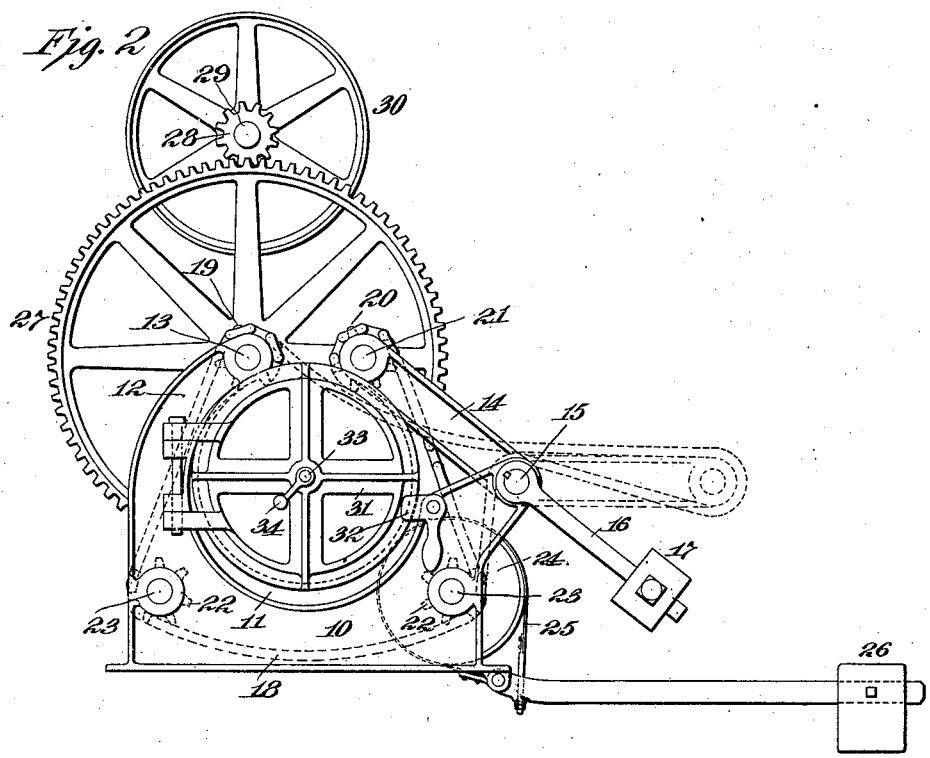

Figure 1 is a diagrammatic view of an apparatus embodying my present improvements, showing in combination with the preferred covering-machine of a three-roll coreless baling-press of common form; Fig. 2, a side view of the preferred construction of covering-machine; Fig. 3, a vertical sectional view thereof, and Fig. 4 a plan view.

In all of the above views corresponding parts are represented by the same numerals of reference.

Referring to Fig. 1, I illustrate a bat-forming device 1 of any suitable type, to which cotton is directed through the lint-flue 2 and by which the cotton will be formed into a practically continuous sheet or bat. The specific bat-former, as shown, is an ordinary double-drum condenser. From the bat-former the sheet or bat is directed down a chute 3 to a baling-press 4 of any suitable type adapted to form a continuous sheet or bat into a cylindrical bale. The baling-press shown is provided with two baling-rolls 5 5, mounted in fixed bearings, and a baling-roll 6, mounted in movable bearings, the latter being connected to the piston of a pressure-cylinder 7, as is common. From the press 4 the finished bale is allowed to roll down a chute 8 into a bale-covering machine 9 of any suitable construction. It will be obvious that after the bale has been formed in the press 4 it may be removed therefrom into a bale-covering machine 9 and a proper covering material applied thereto in the latter device. When a coreless press is used, the time required to remove the bale will be so short as ordinarily not to require the stoppage of the bat-forming device; but when a press is employed using a core the bat-former may be stopped during the removal of the bale and the insertion in position of a new core, although the time thus lost will be obviously less than would be consumed if a covering were applied to the bale in the press. The construction of the bale-covering machine is shown in Figs. 2, 3, and 4, to which attention is particularly directed.

10 represents two suitably-formed side frames, which are connected together by proper cross-pieces, as shown. Each frame is centrally cut away at 11 and is formed with an integral upwardly-projecting arm 12, having a bearing at its end, in which is mounted the main shaft 13.

14 14 are two arms mounted on a rock-shaft 15, carried in bearings in the side frames 10, and to one or both ends of the rock-shaft 15 is connected an arm 16, carrying a counterbalance-weight 17, which preferably about counterbalances the swinging arms 14.

18 is an endless belt, which preferably is formed of metal links, as shown, but which may be made of a tough flexible material, such as rubber, canvas, or leather, or a combination of such materials. When a chain belt is employed, as is preferable, it passes over a series of sprocket-wheels 19, keyed to the shaft 13, and also engages the sprocket-wheels 20, preferably keyed to a shaft 21, mounted in bearings formed in the outer ends of the swinging arms 14. At its lower portion the belt is guided by being passed over sprocket-wheels 22, keyed to shafts 23, having bearings in the side frames, as shown. The endless belt will be formed in a loop or bight between the shafts 13 and 21 for the reception of the finished bale. A tension is imparted to the belt, so as to sufficiently compress the bale to enable the cover to be applied by any suitable means. For this purpose a brake-wheel 24 may be keyed to one of the shafts 23, with which brake a friction-band 25 engages, connected at one end to a weighted brake-lever 26. For the driving of the belt the shaft 13 may be provided with a spur-gear 27, keyed to one extremity, with which may engage a pinion 28 on a shaft 29, carrying a clutch-pulley 30, by which power may be applied. Preferably a hinged frame 31 is mounted at each side of the machine in line with the loop or bight in which the bale is placed. A pivoted latch 32 is used for locking the frames 31 in place when they have been swung in the position shown in Fig. 2. Carried centrally within each of the frames is a threaded shaft 33, provided with a handle 34, by which it may be turned, and having mounted on its inner end a plate or disk 35, which is independently rotatable with respect to the shaft, as will be understood.

The operation of the improved covering-machine is as follows: The swinging arms 14 are first swung outwardly to open the loop or bight, and the finished bale is placed upon the belt 18 within the loop or bight. Power is now applied to the shaft 13 to drive the belt against the tension imposed thereon by the friction-brake, and this tension will obviously result in contracting the belt tightly upon the bale and in holding the swinging arms 14 in their innermost position. (Shown in Figs. 1 and 2.) A suitable covering material is now guided around the bale by the belt and is applied to the bale under the desired tension. This covering material may be substantially equal in width to the bale, so that a single rotation of the bale will be sufficient to apply it, or it may be a comparatively narrow strip which is applied spirally to the bale, as will be understood. After the covering has been applied and secured disks of the covering material are placed on the ends of the bale, which project slightly beyond the belt, as shown in Fig. 4, whereupon the frames 31 are swung closed and the handles 34 are operated to press the disks 35 upon the end coverings to hold the latter in position. The end coverings are then secured to the main covering material in any suitable way—as, for instance, by a stitching of coarse thread applied along the same by slowly rotating the bale within the covering-machine. When the bale has been thus covered, it is removed either by releasing the friction-band 25 and by then swinging the arms 14 downward to the position shown in dotted lines, Fig. 2, to open the loop or bight and permit the bale to roll out, or instead by reversing the rotation of the shaft 13 and by then swinging the arms 14 downward.

Having now described my invention, what I claim as new, and desire to secure by Letters Patent, is as follows:

1. An improved bale-covering machine comprising in combination an endless belt, two supporting-shafts over which the belt passes and between which it is formed in a loop or bight, means for applying power to one of said shafts to drive the belt, swinging arms carrying the other shaft, and means applied to the belt intermediate the loop or bight and the pivot of said swinging arms for resisting movement of the belt, substantially as set forth.

2. An improved bale-covering machine comprising in combination an endless belt, two supporting-shafts over which the belt passes and between which it is formed in a loop or bight, means for applying power to one of said shafts to drive the belt, swinging arms carrying the other shaft, a shaft over which the belt passes located intermediate the loop or bight and the pivot of said swinging arms, and means for resisting the rotation of said shaft, substantially as set forth.

3. An improved bale-covering machine comprising in combination an endless belt, two supporting-shafts over which the belt passes and between which it is formed in a loop or bight, means for applying power to one of said shafts to drive the belt, swinging arms carrying the other shaft, a shaft over which the belt passes located intermediate the loop or bight and the pivot of said swinging arms, and a brake for resisting the rotation of said shaft, substantially as set forth.

4. An improved bale-covering machine comprising in combination an endless belt, two supporting-shafts over which said belt passes and between which it is formed in a loop or bight, means for applying power to one of said shafts to drive the belt, a rock-shaft, swinging arms on said rock-shaft carrying the other shaft over which the belt passes, means for counterbalancing the swinging arms, and means intermediate the belt and said rock-shaft for opposing movement of the belt, substantially as set forth.

5. An improved bale-covering machine comprising in combination an endless belt, two supporting-shafts over which said belt passes and between which it is formed in a loop or bight, means for applying power to one of said shafts to drive the belt, a rock-shaft, swinging arms on said rock-shaft carrying the other shaft over which the belt passes, means for counterbalancing the swinging arms, and a pressure-applying shaft located intermediate the belt and the rock-shaft and with which the belt engages, and means for resisting the rotation of said shaft, substantially as set forth.

6. An improved bale-covering machine comprising in combination an endless belt, two supporting-shafts over which said belt passes and between which it is formed in a loop or bight, means for applying power to one of said shafts to drive the belt, a rock-shaft, swinging arms on said rock-shaft carrying the other shaft over which the belt passes, means for counterbalancing the swinging arms, and a pressure-applying shaft located intermediate the belt and the rock-shaft and with which the belt engages, and a brake for resisting the rotation of said shaft, substantially as set forth.

7. An improved bale-covering machine comprising in combination the side frames, a pair of swinging arms mounted in said side frames, a shaft carried in said swinging arms, a second shaft carried in the side frames in line with the first shaft, an endless belt passing over said shafts and forming between them a loop or bight, means for driving the belt, means for resisting movement of the belt, hinged frames carried by the side frames in line with the loop or bight, and a disk carried by each of said hinged frames for engaging the end of the finished bale, substantially as set forth.

8. An improved bale-covering machine comprising in combination the side frames, a pair of swinging arms mounted in said side frames, a shaft carried in said swinging arms, a second shaft carried in the side frames in line with the first shaft, an endless belt passing over said shafts and forming between them a loop or bight, means for driving the belt, means for resisting movement of the belt, hinged frames carried by the side frames in line with the loop or bight, and a disk carried by each of said hinged frames for engaging the end of the finished bale, said disks being rotatably mounted with respect to the hinged frames, substantially as set forth.

9. An improved bale-covering machine comprising in combination the side frames, a pair of swinging arms mounted in said side frames, a shaft carried in said swinging arms, a second shaft carried in the side frames in line with the first shaft, an endless belt passing over said shafts and forming between them a loop or bight, means for driving the belt, means for resisting movement of the belt, hinged frames carried by the side frames in line with the loop or bight, a disk carried by each of said hinged frames for engaging the end of the finished bale, said disks being rotatably mounted with respect to the hinged frames, and means for applying pressure to said disks, substantially as set forth.

This specification signed and witnessed this 14th day of March, 1900.

MAGNUS SWENSON.

Witnesses:
E. FEWSON,
JAS. H. GIBSON.